United States Patent
Dube et al.

(10) Patent No.: US 11,190,514 B2
(45) Date of Patent: Nov. 30, 2021

(54) CLIENT-SERVER SECURITY ENHANCEMENT USING INFORMATION ACCESSED FROM ACCESS TOKENS

(71) Applicant: Microsoft Technology Licensing, LLC, Redmond, WA (US)

(72) Inventors: Anshul Dube, Brooklyn, NY (US); Xiaoqin Zhu, Redmond, WA (US); Andrew Burke Ryan, Seattle, WA (US); Shankaranand Arunachalam, Redmond, WA (US); Gokay Hurmali, Redmond, WA (US); Dmitri Gavrilov, Redmond, WA (US); Ganesh Pandey, Redmond, WA (US); Parul Manek, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 149 days.

(21) Appl. No.: 16/443,236

(22) Filed: Jun. 17, 2019

(65) Prior Publication Data
US 2020/0396223 A1     Dec. 17, 2020

(51) Int. Cl.
*H04L 29/06*     (2006.01)

(52) U.S. Cl.
CPC .............. *H04L 63/10* (2013.01); *H04L 63/08* (2013.01)

(58) Field of Classification Search
CPC ..... H04L 63/10; H04L 63/08; H04L 63/0807; G06F 21/335
See application file for complete search history.

(56) References Cited

U.S. PATENT DOCUMENTS

| | | | | |
|---|---|---|---|---|
| 7,512,973 | B1* | 3/2009 | Chan | H04L 63/10 380/272 |
| 8,010,783 | B1* | 8/2011 | Cahill | H04L 63/10 713/155 |
| 9,338,007 | B1* | 5/2016 | Doshi | H04L 9/321 |
| 9,621,355 | B1 | 4/2017 | Ochmanski et al. | |
| 9,705,999 | B1* | 7/2017 | Lewis | H04L 67/22 |

(Continued)

OTHER PUBLICATIONS

"Authentication using HTTP Authorization Header in WCF SOAP API", Retrieved From: https://web.archive.org/web/20130921085923/ http:/stackoverflow.com:80/questions/15839565/authentication-using-http-authorization-header-in-wcf-soap-api, Sep. 21, 2013, 3 Pages.

(Continued)

*Primary Examiner* — Aravind K Moorthy
(74) *Attorney, Agent, or Firm* — Christopher J. Volkmann; Kelly, Holt & Christenson, PLLC

(57) ABSTRACT

A service computing system receives an API call in which an authorization token, that contains an identifier in the content of the authorization token, is included in a header of the API call. The identifier is also included as a parameter passed in with the API call. The service computing system parses the API call to obtain the authorization token, and the identifier included in the authorization token. It also obtains the identifier passed in as a parameter of the API call. The service computing system compares the identifier obtained from the authorization token to the identifier passed in as a parameter of the API call to determine whether they match. If they do not match, the API call is processed as an unauthorized API call. A security system in the service computing system authorizes the API call based on the comparison.

12 Claims, 7 Drawing Sheets

(56) References Cited

U.S. PATENT DOCUMENTS

| | | | |
|---|---|---|---|
| 9,781,122 B1 | 10/2017 | Wilson et al. | |
| 10,021,077 B1* | 7/2018 | Brown | H04L 63/08 |
| 10,284,660 B1* | 5/2019 | Nene | H04L 67/02 |
| 10,715,860 B1* | 7/2020 | Bartlett | A63F 13/35 |
| 10,880,292 B2* | 12/2020 | Koottayi | H04L 63/083 |
| 10,903,999 B1* | 1/2021 | Raman | H04L 9/14 |
| 11,012,237 B1* | 5/2021 | Sarda | H04L 9/0894 |
| 11,055,710 B2* | 7/2021 | Wang | G06Q 20/06 |
| 2004/0181598 A1* | 9/2004 | Paya | G06F 16/9574 709/227 |
| 2006/0080428 A1* | 4/2006 | Trossen | H04L 67/16 709/224 |
| 2007/0217370 A1* | 9/2007 | Soong | H04B 7/2621 370/337 |
| 2012/0185695 A1 | 7/2012 | Shah et al. | |
| 2012/0317028 A1* | 12/2012 | Ansari | G06Q 20/0655 705/44 |
| 2013/0080785 A1* | 3/2013 | Ruhlen | H04L 67/1002 713/176 |
| 2013/0160099 A1* | 6/2013 | Fitzpatrick, III | G06F 21/335 726/7 |
| 2013/0167237 A1* | 6/2013 | Amit | G06F 21/577 726/25 |
| 2013/0179388 A1 | 7/2013 | Bekker et al. | |
| 2013/0332730 A1* | 12/2013 | Cosentino | G06F 21/6245 713/168 |
| 2014/0195607 A1* | 7/2014 | Kowalewski | H04L 67/06 709/204 |
| 2015/0026799 A1* | 1/2015 | Terao | G06F 21/6218 726/20 |
| 2015/0082402 A1* | 3/2015 | Turakhia | H04L 63/0876 726/7 |
| 2015/0150109 A1* | 5/2015 | Bocanegra | H04L 63/0807 726/9 |
| 2015/0180857 A1* | 6/2015 | Schulman | H04L 63/0807 726/9 |
| 2015/0269377 A1* | 9/2015 | Gaddipati | G06F 21/44 726/30 |
| 2015/0350179 A1* | 12/2015 | Kobayashi | H04L 9/3273 726/4 |
| 2016/0105780 A1* | 4/2016 | Hooker | H04L 65/1016 370/338 |
| 2016/0182493 A1* | 6/2016 | Volini | H04L 63/08 713/158 |
| 2016/0191478 A1* | 6/2016 | Pruss | H04L 63/0272 713/171 |
| 2016/0241389 A1* | 8/2016 | Le Saint | H04L 9/0825 |
| 2017/0070542 A1* | 3/2017 | Tsai | H04L 67/1068 |
| 2017/0097873 A1* | 4/2017 | Krishnamachari | G06F 3/0688 |
| 2017/0099148 A1* | 4/2017 | Ochmanski | H04L 63/083 |
| 2017/0141926 A1* | 5/2017 | Xu | H04L 9/3252 |
| 2017/0149790 A1* | 5/2017 | Yamamoto | G06F 21/44 |
| 2017/0244706 A1* | 8/2017 | Ren | H04L 63/102 |
| 2017/0318453 A1* | 11/2017 | Raghu | H04W 4/80 |
| 2017/0374177 A1* | 12/2017 | Chrysanthakopoulos | H04L 67/02 |
| 2018/0075103 A1* | 3/2018 | Kogan | G06F 16/2455 |
| 2018/0077015 A1* | 3/2018 | Ungati | H04L 41/5054 |
| 2018/0077250 A1* | 3/2018 | Prasad | H04L 67/22 |
| 2018/0096128 A1* | 4/2018 | Hiramatsu | G06F 21/43 |
| 2018/0219863 A1* | 8/2018 | Tran | H04L 63/06 |
| 2018/0278583 A1* | 9/2018 | Cela | H04L 9/0841 |
| 2018/0278603 A1* | 9/2018 | Yabe | H04L 63/10 |
| 2018/0278624 A1* | 9/2018 | Kuperman | G06F 21/602 |
| 2018/0330368 A1* | 11/2018 | Slupesky | G06Q 20/38215 |
| 2018/0332009 A1* | 11/2018 | Lange | A61B 5/0022 |
| 2018/0359234 A1* | 12/2018 | Kobayashi | G06F 21/45 |
| 2018/0368197 A1* | 12/2018 | Zeilingold | G16H 40/67 |
| 2019/0007212 A1* | 1/2019 | Neve de Mevergnies | G06F 21/6218 |
| 2019/0007409 A1* | 1/2019 | Totale | H04L 9/3213 |
| 2019/0014127 A1* | 1/2019 | Zhao | H04L 51/22 |
| 2019/0026716 A1* | 1/2019 | Anbukkarasu | G06Q 20/389 |
| 2019/0052672 A1* | 2/2019 | Kumar | H04L 63/1425 |
| 2019/0082239 A1* | 3/2019 | Webster | H04N 21/8545 |
| 2019/0089710 A1* | 3/2019 | Weinert | H04L 63/08 |
| 2019/0098483 A1* | 3/2019 | Qi | H04W 48/16 |
| 2019/0149469 A1* | 5/2019 | Surcouf | H04L 61/6063 370/392 |
| 2019/0165942 A1* | 5/2019 | Subramaniam | G06F 9/30018 |
| 2019/0166094 A1* | 5/2019 | Weatherill | H04L 63/029 |
| 2019/0197243 A1* | 6/2019 | Hendrickx | G06F 21/14 |
| 2019/0312730 A1* | 10/2019 | Engan | H04L 9/3213 |
| 2019/0320041 A1* | 10/2019 | Oshima | H04L 67/32 |
| 2019/0357055 A1* | 11/2019 | Liu | H04W 92/20 |
| 2019/0372766 A1* | 12/2019 | Bahrenburg | G06F 21/44 |
| 2019/0394041 A1* | 12/2019 | Jain | H04L 63/08 |
| 2019/0394187 A1* | 12/2019 | Fletcher | H04L 63/0807 |
| 2020/0007530 A1* | 1/2020 | Mohamad Abdul | H04L 67/26 |
| 2020/0019678 A1* | 1/2020 | Kunnath | H04L 63/0815 |
| 2020/0036526 A1* | 1/2020 | Kennedy | H04L 63/108 |
| 2020/0106612 A1* | 4/2020 | Baba | H04W 12/35 |
| 2020/0112487 A1* | 4/2020 | Inamdar | H04L 41/082 |
| 2020/0186505 A1* | 6/2020 | Amar | H04L 67/303 |
| 2020/0186507 A1* | 6/2020 | Dhanabalan | H04L 63/0478 |
| 2020/0213217 A1* | 7/2020 | Nye | G06N 3/084 |
| 2020/0304507 A1* | 9/2020 | Pandey | H04L 63/102 |
| 2021/0005307 A1* | 1/2021 | Knoplioch | |

OTHER PUBLICATIONS

"How to add a custom HTTP header to every WCF call?", Retrieved From: https://web.archive.org/web/20170519130634/https://stackoverflow.com/questions/964433/how-to-add-a-custom-http-header-to-every-wcf-call, May 19, 2017, 5 Pages.

"How to: Set Headers in the Client Request (WCF Data Services)", Retrieved From: https://docs.microsoft.com/en-US/dotnet/framework/data/wcf/how-to-set-headers-in-the-client-request-wcf-data-services, Mar. 30, 2017, 3 Pages.

"Protecting Windows Communication Foundation (WCF) With Azure AD". Retrieved From: https://help.insight.com/app/answers/detail/a_id/178/~/protecting-windows-communication-foundation-%28wcf%29-with-azure-ad, Oct. 12, 2018, 13 Pages.

Nemiro, Aleksey, "Users Authorization through OAuth in .NET Framework", Retrieved From: https://www.codeproject.com/Arficles/875991/Users-Authorization-through-OAuth-in-NET-Framework, Aug. 9, 2016, 35 pages.

Taylor, Greg. "Deep Dive: How Hybrid Authentication Really Works", Retrieved From: https://blogs.technet.microsoft.com/exchange/2017/05/24/deep-dive-how-hybrid-authentication-really-works/, May 24, 2017, 5 Pages.

Hardt, D., "RFC 6749 The OAuth 2.0 Authorization Framework", Retrieved From: https://tools.ietf.org/pdf/rfc6749.pdf, Oct. 2012, 76 Pages.

Lodderstedt, et al., "OAuth 2.0 Threat Model and Security Considerations; draft-ietf-oauth-v2-threatmodel-00.txt", Retrieved From: https://tools.ietf.org/html/draft-ietf-oauth-v2-threatmodel-00, Jul. 1, 2011, 63 Pages.

"International Search Report and Written Opinion Issued in PCT Application No. PCT/US2020/030056", dated Jul. 31, 2020, 10 Pages.

\* cited by examiner

CLIENT-SERVER SECURITY ENHANCEMENT USING INFORMATION ACCESSED FROM ACCESS TOKENS

BACKGROUND

Computer systems are currently in wide use. Some such computer systems are arranged in a client-server architecture. In such an architecture, a server provides a service by exposing an application programming interface (API) that can be called by a client computing system in order to gain access to resources maintained by the server.

The service is often arranged to maintain the resources based on different tenants or organizations that are using the resources. Thus, when a client computing system wishes to gain access to a resource, the client computing system calls the API, exposed by the service, and includes an organization identifier, or a user identifier, as one of the parameters in the API call. The tenant identifier identifies an organization, or organization object, corresponding to the resource to be accessed, and the user identifier identifies a user, or user object, corresponding to the resource to be accessed.

The discussion above is merely provided for general background information and is not intended to be used as an aid in determining the scope of the claimed subject matter.

SUMMARY

A service computing system receives an API call in which an authorization token, that contains an identifier in the content of the authorization token, is included in a header of the API call. The identifier is also included as a parameter passed in with the API call. The service computing system parses the API call to obtain the authorization token, and the identifier included in the authorization token. It also obtains the identifier passed in as a parameter of the API call. The service computing system compares the identifier obtained from the authorization token to the identifier passed in as a parameter of the API call to determine whether they match. A security system in the service computing system authorizes the API call based on the comparison.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, in a client-server computing system architecture, client computing systems often access resources at the server level by making API calls using an API exposed by the server. As one example, a first service located in the cloud, can act as a client and interact with a second service, located in the cloud, by making an API call on the API exposed by the second service. In some current architectures, as long as the API call can be authenticated, then it is processed and there is no check on the parameters passed into the API, with the API call. In order to increase security, in some current systems, the API call has a header in which information can be placed by the first service, acting as the client computing system. Thus, in some current systems, the client computing system places an identifier, that identifies a tenant or user whose resources are to be accessed, in the header of the API call. The client also inserts the identifier as a parameter in the API call. In such a system, a security system on the server side (in this example, the second service) accesses the identifier in the header, and compares it to the identifier passed in as a parameter, and if the two match, then the API call is authorized to proceed.

However, this can still lead to security issues. For instance, if a surreptitious user obtains access to a client DLL, the surreptitious user can then create an instance of the client. That client can generate an API call that has, as a parameter, an identifier identifying an entity (such as an organization or user) and which also requests access to resources of the identified entity. The surreptitious actor can also place the identifier in the header of the API call. Thus, if the surreptitious actor obtains access to a client DLL, then the surreptitious actor can also obtain access to the client's resources at the server level.

The present description thus proceeds with respect to a system in which the client computing system obtains a signed authorization token, that includes the identifier, and places the signed authorization token in the header of the API call, and also includes the identifier as a parameter in the API call. When the server computing system receives the API call, it parses the header information to obtain the signed authorization token and ensures that the authorization token is authorized (that it hasn't been changed). It then obtains the identifier from the authorization token and compares it against the identifier that was passed in as a parameter. It authorizes the API call based upon the comparison. In this way, even if a surreptitious actor obtains a client DLL, it cannot make an authorized API call to obtain access to the client's resources, because it will not be able to obtain a signed authorization token from the token issuer. Thus, at the server level, the API call will be processed as an unauthorized API call.

Figure 1:
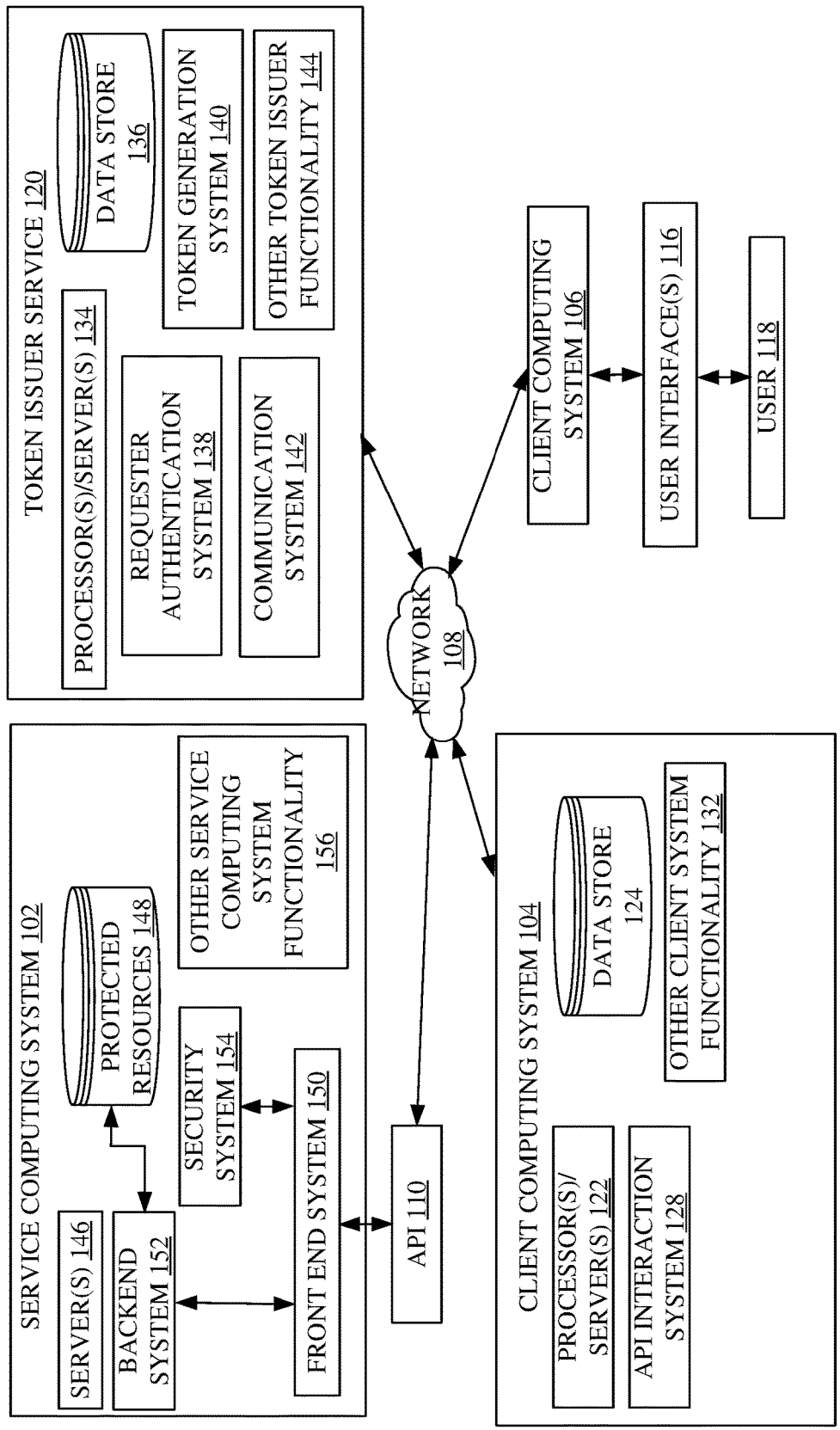
FIG. 1 is a block diagram of one example of a computing system architecture.

FIG. 1 is a block diagram of one example of a computing system architecture 100 that further illustrates this. In the example shown in FIG. 1, architecture 100 includes a service computing system 102 and a plurality of different client computing systems 104-106 that can access resources on service computing system 102 over network 108. Network 108 can thus be any of a wide variety of different types of networks such as a wide area network, a local area network, a near field communication network, a cellular network, among a wide variety of other networks or combinations of networks.

Also, in the example shown in FIG. 1, service computing system 102 exposes an application programming interface (API) 110 for interaction by client computing systems 104-106. The client computing systems 104-106 can make API calls on the exposed API 110 in order to gain access to service computing system 102 and the resources.

For the purposes of the present description, it is assumed that client computing system 104 is a service that is a client (or can act as a client) of service computing system 102. It can be running, for example, in the same cloud service computing system 102.

Architecture 100 also shows that, in one example, client computing system 106 generates user interfaces 116 for interaction by user 118. User 118 can be an administrative user, or another user, who may wish to access resources on service computing system 102. User 118 illustratively interacts with user interfaces 116, in order to control and manipulate client computing system 106, and some portions of service computing system 102.

By way of example, assume that service computing system 102 is an electronic mail (email) service computing system administrative user 118 wishes to move a mailbox in service computing system 102. Administrative user 118 Assume further that can run a command on computing system 106 to create a request to move the identified mailbox. In that case, client computing system 104 may pick up that request and call service computing system 102 (as a client of system 102) requesting access to the resource (e.g., the mailbox). It can do so by making an access request call on the API 110 exposed by system 102.

Also, in the example shown in FIG. 1, architecture 100 shows a token issuer service 120 that can issue tokens to client computing system 104 directly (if they are in the same cloud) or over network 108. Briefly, by way of example, client computing system 104 can obtain an authorization token from token issuer service 120. The request for a token generated by client computing system 104 can be scoped by an identifier that identifies the user or organization which corresponds to the resources that are to be accessed on service computing system 102. The authorization token issued by service 120 includes, in the content of the token, that identifier. Continuing with the above example, the identifier may identify the tenant or user corresponding to the mailbox to be moved.

Client computing system 104 then generates an API call on API 110 which includes the authorization token in the header of the API call, and the identifier as a parameter that is passed in with the API call. Service computing system 102 authorizes the API call by comparing the identifier in the token (which is retrieved from the header of the API call) to the identifier that is passed in as a parameter with the API call. If the two match then the API call proceeds. If not, it is unauthorized.

Before describing the operation of architecture 100 in more detail, a brief description of some of the items in architecture 100, and their operation, will first be described. Client computing systems 104-106 can be similar or different. In the example described herein, it is assumed that client computing system 104 is a service that acts as a client of service computing system 102. Client computing system 106 is illustratively a computing system used by an administrative user or other user who requests access to resources on computing system 102. Therefore, only client computing system 104 is described in more detail.

In the example shown in FIG. 1, client computing system 104 illustratively includes one or more processors or servers 122, data store 124, communication system 126, API interaction system 128, and it can include a wide variety of other client system functionality 132. Communication system 126 can be used to communicate over network 108 with token issuer service 120 and service computing system 102 (using API 110). Thus, communication system 126 can be any of a wide variety of different types of communication systems, depending on the particular type of network or combinations of networks over which it is to communicate.

API interaction system 128 illustratively generates API calls for API 110. Thus, in one example, API interaction system 128 illustratively receives a request generated by user 118 indicating that user 118 wishes to gain access to resources on service computing system 102. It thus generates an API call that is used to call API 110 to gain access to those resources. In doing so, it illustratively obtains the authorization token from token issuer service 120 and puts it in the header of the API call. It also illustratively receives responses to the API call and processes those accordingly. This is described in greater detail below. Other client system functionality 132 can include a wide variety of other client computing system functionality.

Token issuer service 120 illustratively includes one or more processors or servers 134, data store 136, requestor authentication system 138, token generation system 140, communication system 142, and it can include a wide variety of other token issuer functionality 144. Communication system 142 illustratively communicates over network 108. Therefore, it can be any of a wide variety of different types of communication systems or combinations of systems that are used to communicate over network 108.

Requestor authentication system 138 illustratively authenticates requests for tokens. In one example, token issuer service 120 receives an indication from service computing system 102 indicating that client computing system 104 is authorized to access certain resources on service computing system 102. Thus, requestor authentication system 138 shares a secret with client computing system 104. API interaction system 128 uses that secret when requesting an authorization token from token issuer service 120. Requestor authentication system 138 also uses that secret in order to authenticate client computing system 104 as being a system that can request authorization tokens from service 120.

Token generation system 140 generates the authorization tokens. In one example, a request for an authorization token to access resources on service computing system 102 includes an identifier identifying the organization or user whose resources are being accessed. In that case, token generation system 140 generates the authorization token so that it includes the identifier within the authorization token, itself. As one example, system 140 can generate authorization tokens to include three or more different portions. They can include a metadata portion, a content (or claims) portion, and a signature portion. The content or claims portion may be a portion in which the identifier is contained. The signature portion includes a signature. Once the token is signed an authorized recipient of the token will be able to determine whether the token has been modified, based upon the signature.

In the example shown in FIG. 1, service computing system 102 includes one or more different servers 146, protected resources 148, a frontend system 150, a backend system 152, a security system 154, and it can include a wide variety of other service computing system functionality 156. Front end system 150 illustratively exposes API 110 which can receive API calls from client computing system 104.

When a call is received that requests access to protected resources 148, frontend system 150 illustratively provides security system 154 with access to that API call. In one example, security system 154 parses the API call to obtain the authorization token from the header of the API call. It first authenticates the authorization token, itself. Using the signature on the authorization token, it determines whether any of the content or metadata or other information in the authorization token has been modified. If so, then the call will fail, because the authorization token has been modified. Assuming that the authorization token, itself, is authenticated by security system 154, security system 154 then goes on to determine whether the API call is authorized. Security system 154 obtains the identifier from the authorization token, and it obtains the identifier that was passed in as a parameter at the API call. It compares the two and determines whether the API call is authorized.

If the API call is authorized, then it is passed to backend system 152 which provides the requested access to protected resources 148. If it is not authorized, then it is processed by service computing system 102 as an unauthorized API request. This can include such things as alerting security personnel, simply refusing the requested access, among other things.

Figure 2:
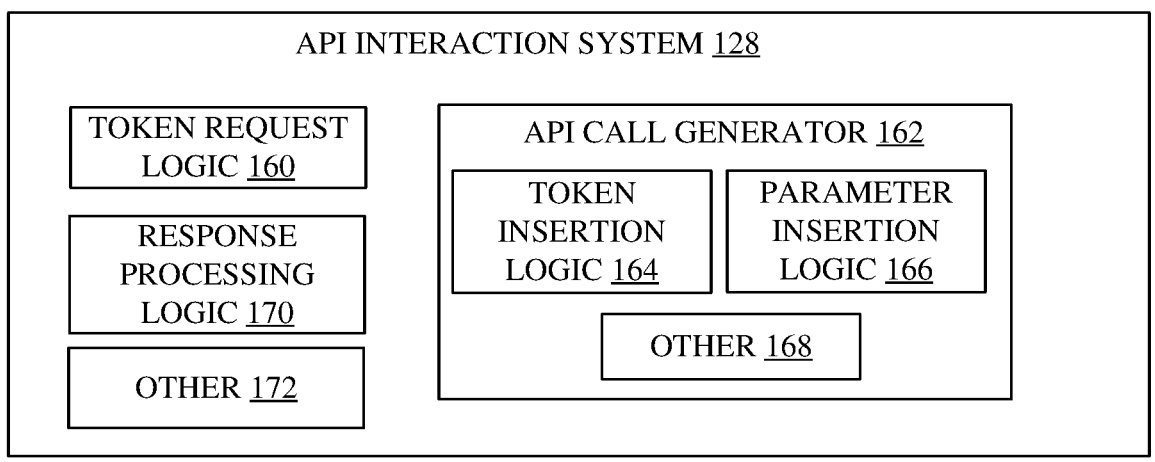
FIG. 2 is a block diagram showing one example of an API interaction system, in more detail.

FIG. 2 is a block diagram showing one example of API interaction system 128, in more detail. API interaction system 128 illustratively includes token request logic 160, API call generator 162 (which, itself, includes token insertion logic 164, parameter insertion logic 166, and it can include other items 168), response processing logic 170, and it can include other items 172. Token request logic 160 illustratively requests an access token from, and handles interactions with, token issuer service 120. Thus, when an authorization token (or access token) is needed, it requests the token from token issuer service 120 and provides that token to API call generator 162. In the example illustrated herein, API call generator 162 illustratively generates an API call which can include a header and parameters, among other things. Token insertion logic 164 inserts the authorization token received from token request logic 160 into the header of the API call. Parameter insertion logic 166 generates and inserts the parameters, based on the particular access request being made in the API call. API call generator 162 can then provide the API call to communication system 126 (shown in FIG. 1) where it is provided to API 110. When API 110 provides a response to the API call, response processing logic 170 obtains that response and processes it, as desired, based upon the access request performed.

Figure 3:
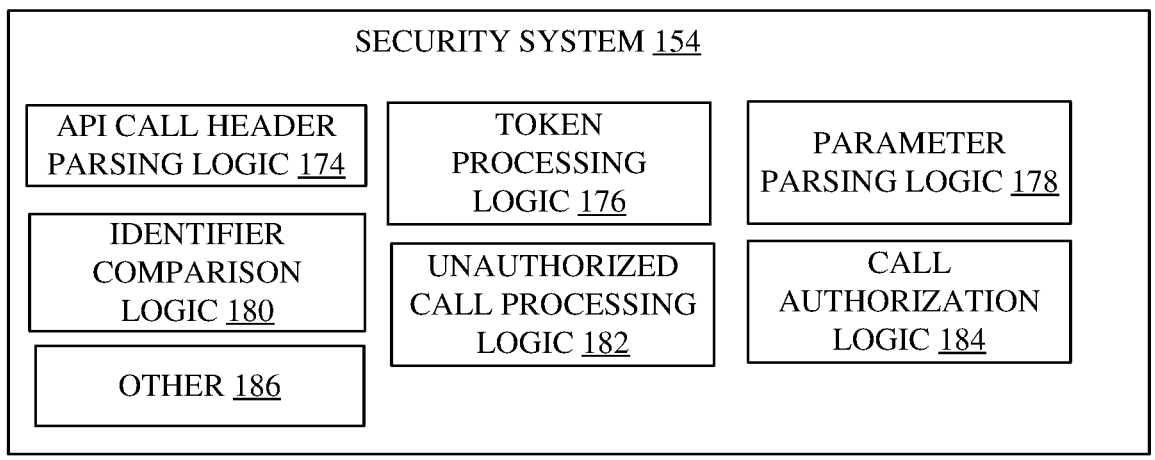
FIG. 3 is a block diagram showing one example of a security system, in more detail.

FIG. 3 is a block diagram showing one example of security system 154, in more detail. In the example shown in FIG. 3, security system 154 illustratively includes API call header parsing logic 174, token processing logic 176, parameter parsing logic 178, identifier comparison logic 180, unauthorized call processing logic 182, call authorization logic 184, and it can include a wide variety of other items 186. API call header parsing logic 174 illustratively parses the API call to identify the authorization token in the header of the API call. It provides the authorization token to token processing logic 176. Token processing logic 176 illustratively processes the authorization token to determine whether it is authentic and authorized. For instance, based upon the signature in the authorization token, logic 176 can determine whether any part of the authorization token has been altered, since it was signed. If not, and the authorization token, itself, is authentic and authorized, then token processing logic 176 illustratively identifies the particular identifier, that was used by token request logic 160 to scope the authorization token request when it requested a token from token issuer service 120. Recall that, in one example, that identifier is included in the content portion of the authorization token. Parameter parsing logic 178 then parses the parameters in the API call to obtain the identifier that was passed in as a parameter.

Identifier comparison logic 180 compares the identifier that was retrieved from the authorization token with the identifier that was retrieved from the parameters of the API call. It determines whether those identifiers are the same. If not, then unauthorized call processing logic 182 processes the API call as an unauthorized call. If so, then call authorization logic 184 indicates that processing of the API call can proceed.

Figure 4:
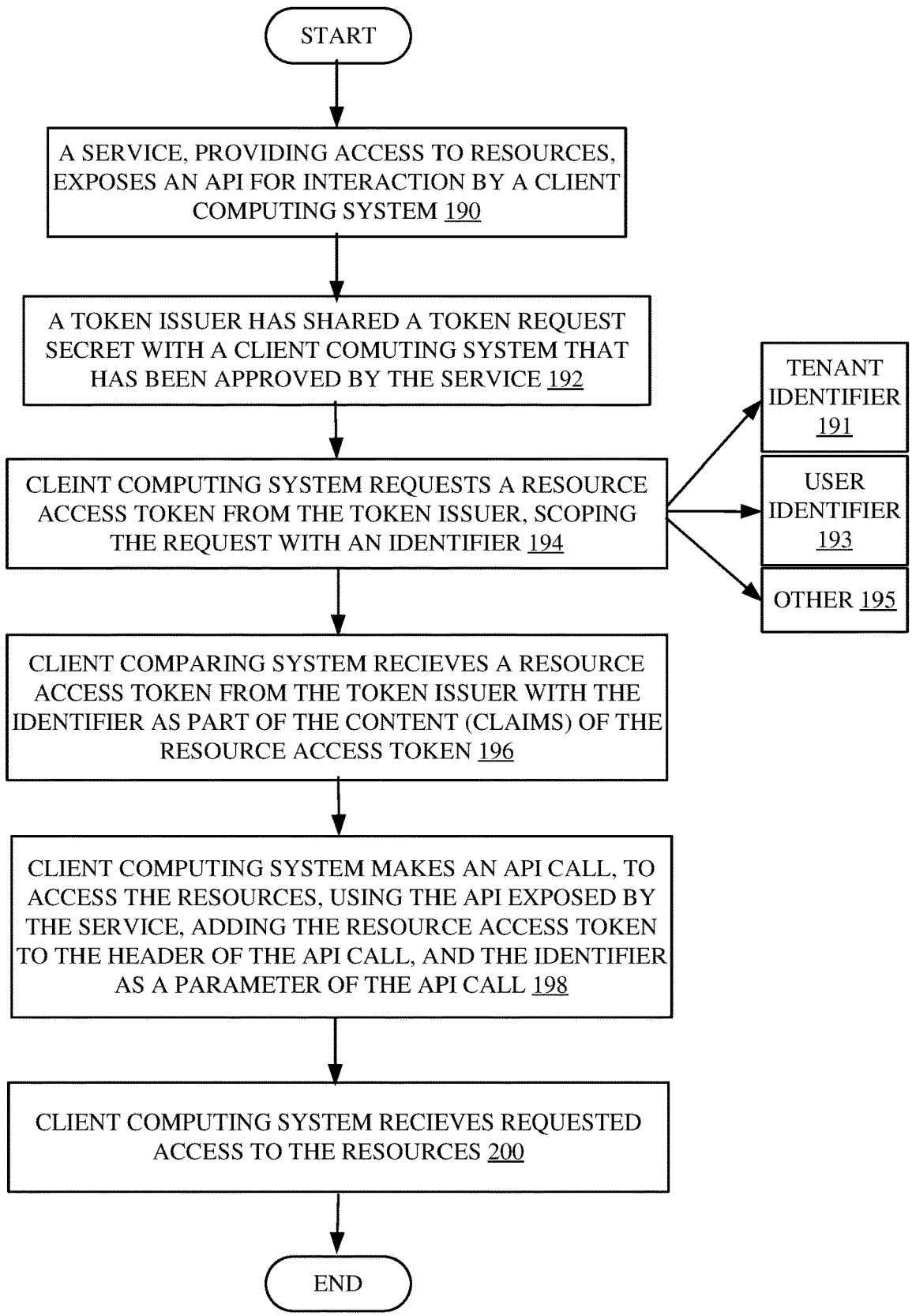
FIG. 4 is a flow diagram illustrating one example of the operation of a client computing system in making an API call.

FIG. 4 is a flow diagram illustrating one example of the operation of client computing system 104 and API interaction system 128 in requesting an authorization token and generating an API call using that authorization token. It is first assumed that a service (e.g., service computing system 102) is providing access to protected resources (e.g., resources 148) and that it exposes an API 110 for interaction by a client computing system (in this example, client computing system 104). This is indicated by block 190 in the flow diagram of FIG. 4.

It is also assumed that a token issuer service 120 has shared a token request secret with client computing system 104, and that client computing system 104 has been approved (to token issuer service 120) by service computing system 102. This is indicated by block 192 in the flow diagram of FIG. 4.

At some point, when client computing system 104 wishes to obtain access to protected resources 148 on service computing system 102, then token request logic 160 requests a resource access token from the token issuer service 120. In doing so, it illustratively scopes the access request with an identifier (which identifies the user or organization whose resources are to be accessed). Requesting the token and scoping the request with the identifier is indicated by block 194 in the flow diagram of FIG. 4. The identifier can be a tenant identifier. This is indicated by block 191. It can be a user identifier as indicated by block 193, or another identifier as indicated by block 195.

The token is generated by token generation system 140 which includes the identifier in the content portion of the token. It also signs the token and provides it back to token request logic 160. Receiving the resource access token from the token issuer 120 with the identifier being part of the content (e.g., claims) of the resource access token is indicated by block 196 in the flow diagram of FIG. 4.

API call generator 164 then generates an API call to request access to the resources using the API 110 exposed by service computing system 102. Token insertion logic 164 inserts the resource access token in the header of the API call. Parameter insertion logic 166 inserts the identifier as a parameter of the API call. Generating the API call in this way is indicated by block 198 in the flow diagram of FIG. 4.

Service computing system 102 then authenticates and authorizes the API call and, if authenticated and authorized, responds to the API call. Response processing logic 170 illustratively receives requested access to the resources, as indicated by the response from service computing system 102. Receiving the requested access is indicated by block 200 in the flow diagram of FIG. 4.

Figure 5:
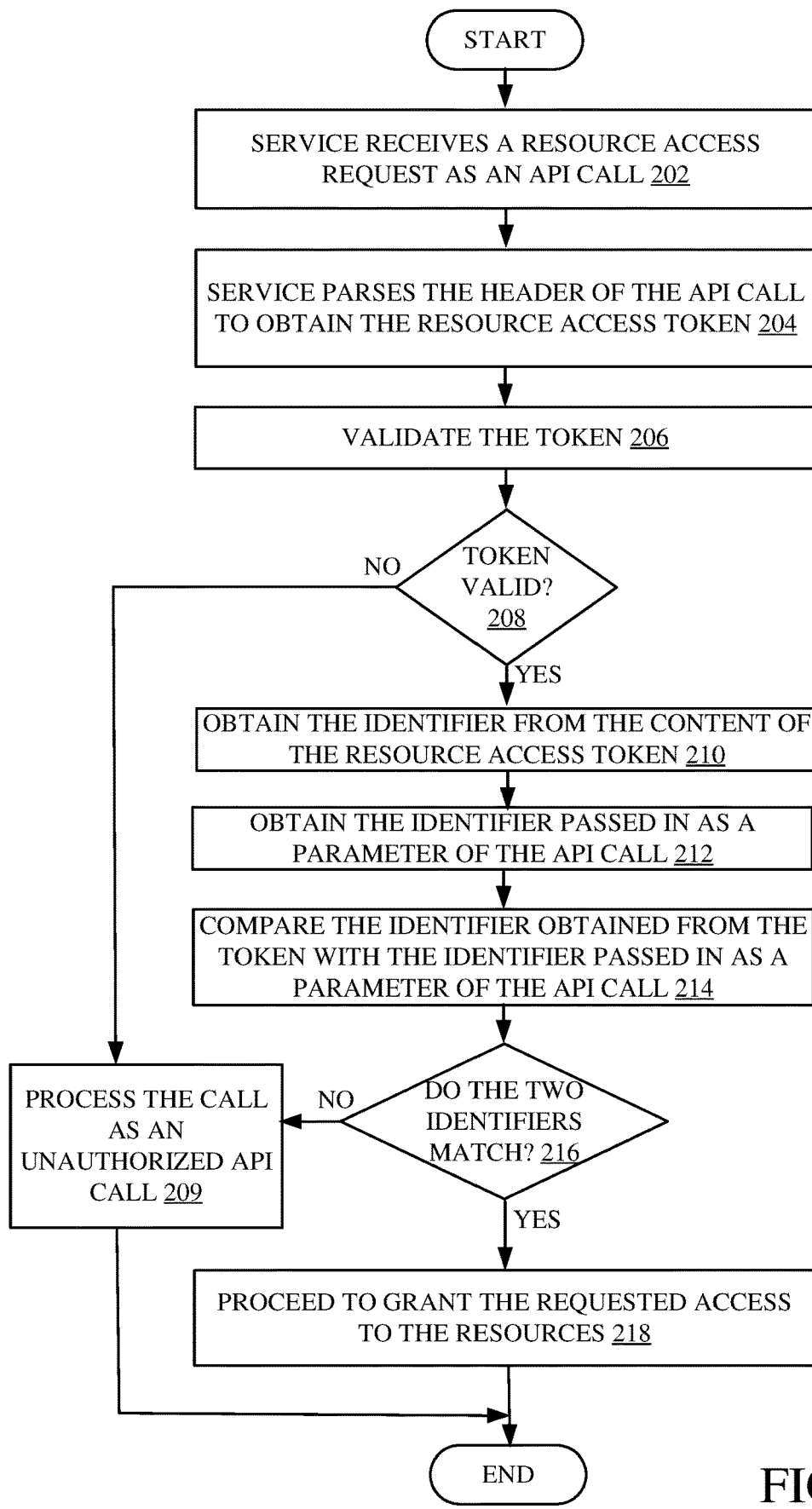
FIG. 5 is a flow diagram illustrating one example of the operation of a service computing system in authorizing API calls.

FIG. 5 is a flow diagram illustrating one example of the operation of security system 154, and service computing system 102, in processing an API call that requests access to protected resources 148. Frontend system 150 first receives the resource access request as an API call through API 110. This is indicated by block 202 in the flow diagram of FIG. 5. Header parsing logic 174 then parses the header of the API call to obtain the resource access token that was inserted in the header by token insertion logic 164 on client computing system 104. Parsing the header to obtain the resource access token is indicated by block 204 in the flow diagram of FIG. 5.

Token processing logic 176 then validates the token. For instance, it can access the signature on the token to determine whether the token has been changed since it was issued by the token issuer service 120. Validating the token is indicated by block 206 in the flow diagram of FIG. 5. If the token is not valid, as indicated by block 208, then the API call is processed as an unauthorized API call, as indicated by block 209.

However, if, at block 208, token processing logic 176 does validate the token, then token processing logic 176 obtains the identifier from the content portion of the resource access token. This is indicated by block 210 in the flow diagram of FIG. 5.

Parameter parsing logic 178 then obtains the identifier that was passed in as a parameter of the API call. This is indicated by block 212. Identifier comparison logic 180 compares the identifier obtained from the token with the identifier passed in as a parameter of the API call. This is indicated by block 214.

If the two identifiers do not match, as indicated by block 216, then unauthorized call processing logic 182 processes the API call as an unauthorized API call. Again, this is indicated by block 209.

However, if, at block 216, it is determined that the two identifiers do match, then call authorization logic 184 proceeds to process the call as an authorized API call, thus granting the requested access to the protected resources 148. This is indicated by block 218 in the flow diagram of FIG. 5.

It can thus be seen that the present description greatly enhances the security of protected resources in a client server architecture. By obtaining an authorization token, that includes an identifier provided by the requesting client in the token, and by then having the client include that token in the API call, a surreptitious user is unable to gain unauthorized accesses to the protected resources, even if the surreptitious user were to obtain a client DLL. Thus, security is greatly enhanced.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
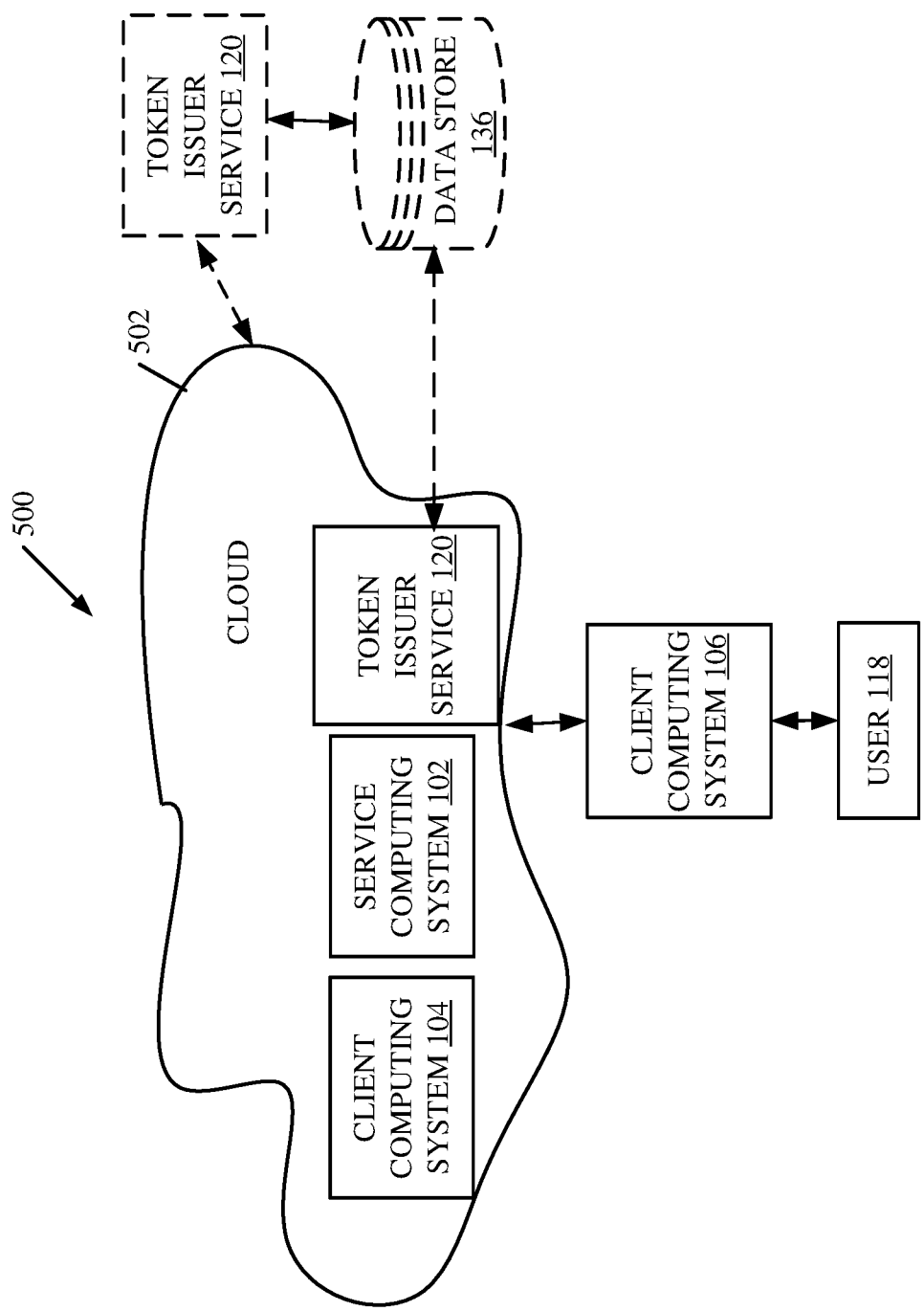
FIG. 6 is a block diagram showing one example of the architecture illustrated in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that systems 102 and 104 and service 120 can be located in cloud 502 (which can be public, private, or a combination where portions are public while others are private). Therefore, user 118 uses a user device and client computing system 106 to access those systems through cloud 502.

FIG. 6 also depicts another example of a cloud architecture. FIG. 6 shows that it is also contemplated that some elements of architecture 100 can be disposed in cloud 502 while others are not. By way of example, token issuer service 120, as well as data store 136 can be disposed outside of cloud 502, and accessed through cloud 502. Regardless of where they are located, they can be accessed directly by systems, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
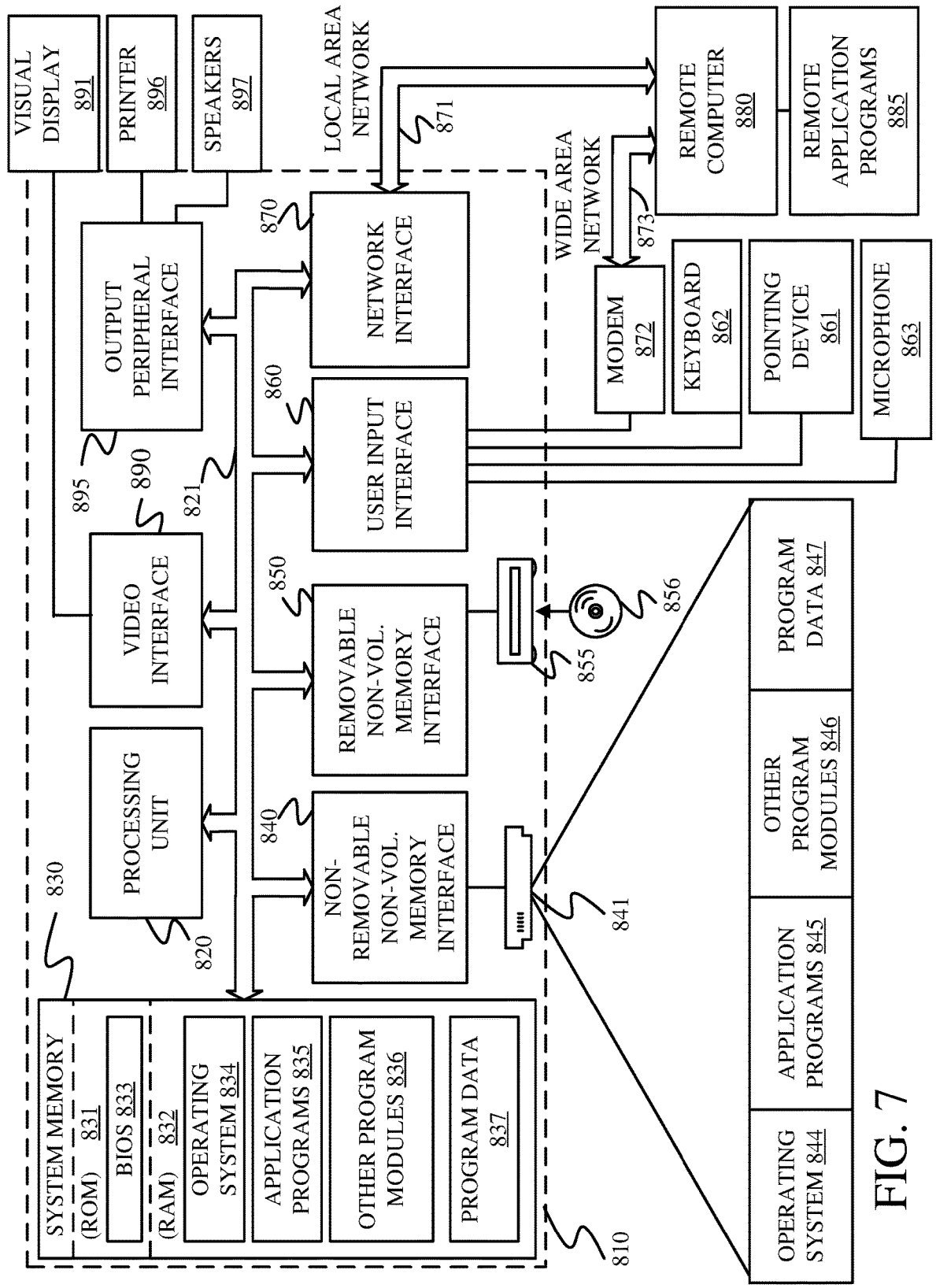
FIG. 7 is a block diagram showing one example of a computing environment that can be used in the architectures shown in the previous figures.

FIG. 7 is one example of a computing environment in which architecture 100, or parts of it, (for example) can be deployed. With reference to FIG. 7, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
a processor;
a front end system that exposes an application programming interface (API) that receives an access request requesting access to a protected resource, the access request having a header portion and a parameter portion; and
a security system that identifies a resource access token in the header portion of the access request and authorizes the access request based on information in the resource access token and in the parameter portion of the resource access request.

Example 2 is the computing system of any or all previous examples wherein the security system comprises:
API header parsing logic configured to parse the header portion to identify the resource access token.

Example 3 is the computing system of any or all previous examples wherein the resource access token has a content portion that includes a first identifier and wherein the parameter portion of the access request has a second identifier.

Example 4 is the computing system of any or all previous examples wherein the security system comprises:
token processing logic configured to identify the first identifier in the content portion of the resource access token.

Example 5 is the computing system of any or all previous examples wherein the security system comprises:
parameter parsing logic configured to identify the second identifier in the parameter portion of the access request.

Example 6 is the computing system of any or all previous examples wherein the security system comprises:
identifier comparison logic configured to compare the first identifier with the second identifier and generate a comparison result indicative of the comparison; and
authorization logic configured to determine whether the access request is an authorized access request based on the comparison result.

Example 7 is the computing system of any or all previous examples wherein the first and second identifiers identify a user corresponding to the protected resource.

Example 8 is the computing system of any or all previous examples wherein the first and second identifiers identify an organization corresponding to the protected resource.

Example 9 is the computing system of any or all previous examples wherein the resource access token has a signature portion that has a signature and wherein the token processing logic is configured to authenticate the resource access token based on the signature.

Example 10 is a client computing system, comprising:
a processor;
token request logic that obtains an access token from a token issuer;
an application programming interface (API) call generator that generates a resource access request call to an API to request access to a protected resource, the resource access request call including a set of parameters and including, in a header portion of the resource access request call, the access token; and
a communication system that communicates the resource access request call to the API.

Example 11 is the client computing system of any or all previous examples wherein the API call generator comprises:
token insertion logic configured to insert the access token in the header portion of the resource access request call, the access token including, in a content portion of the access token, a first identifier.

Example 12 is the client computing system of any or all previous examples wherein the API call generator comprises:
parameter insertion logic configured to insert a second identifier in the set of parameters.

Example 13 is the client computing system of any or all previous examples wherein the first and second identifiers identify a user corresponding to the protected resource.

Example 14 is the client computing system of any or all previous examples wherein the first and second identifiers identify an organization corresponding to the protected resource.

Example 15 is a computer implemented method, comprising:
exposing an application programming interface (API);
receiving, through the API, an access request requesting access to a protected resource, the access request having a header portion and a parameter portion;
identifying a resource access token in the header portion of the access request; and authorizing the access request based on information in the resource access token and in the parameter portion of the resource access request.

Example 16 is the computer implemented method of any or all previous examples wherein identifying a resource access token comprises:

parsing the header portion to identify the resource access token.

Example 17 is the computer implemented method of any or all previous examples wherein authorizing comprises:

parsing a content portion of the resource access token to identify a first identifier.

Example 18 is the computer implemented method of any or all previous examples wherein authorizing comprises:

parsing the parameter portion of the access request to identify a second identifier.

Example 19 is the computer implemented method of any or all previous examples wherein authorizing comprises:

comparing the first identifier with the second identifier; and generating a comparison result indicative of the comparison.

Example 20 is the computer implemented method of any or all previous examples wherein authorizing comprises:

authorization logic configured to determine whether the access request is an authorized access request based on the comparison result.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   a processor;
   a front end system that exposes an application programming interface (API) that receives an access request requesting access to a protected resource, the access request having a header portion and a parameter portion; and
   a security system configured to:
      identify a resource access token in the header portion of the access request;
      identify a first identifier in a content portion of the resource access token;
      identify a second identifier in the parameter portion of the access request;
      generate a comparison result indicative of a comparison of the first identifier with the second identifier; and
      authorize the access request based on the comparison result.

2. The computing system of claim 1 wherein the security system comprises:
   API header parsing logic configured to parse the header portion to identify the resource access token.

3. The computing system of claim 1, wherein the first and second identifiers identify a user corresponding to the protected resource.

4. The computing system of claim 1, wherein the first and second identifiers identify an organization corresponding to the protected resource.

5. The computing system of claim 1, wherein the resource access token has a signature portion that has a signature generated by a token issuer service, and wherein the token processing logic is configured to;
   determine, based on the signature, whether the token has changed since it was issued by the token issuer service, and
   authenticate the resource access token based on the determination.

6. The computing system of claim 1, wherein
   the computing system comprises a service computing system,
   the front end system receives the access request from a client computing system, and
   the resource access token is generated by a token issuer service.

7. The computing system of claim 6, wherein the security system is configured to:
   provide, to the token issuer service, an indication that the client computing system is authorized to access the protected resource, wherein the token is generated by the token issuer service based on the indication, and
   authorize the access request based on a determination that the first and second identifiers match.

8. A computer implemented method, comprising:
   exposing an application programming interface (API);
   receiving, through the API, an access request requesting access to a protected resource, the access request having a header portion and a parameter portion;
   identifying a resource access token in the header portion of the access request, wherein the resource access token has a content portion that includes a first identifier, and the parameter portion of the access request has a second identifier;
   generating a comparison result indicative of a comparison of the first identifier with the second identifier; and
   authorizing the access request based on the comparison result.

9. The computer implemented method of claim 8 wherein identifying a resource access token comprises:
   parsing the header portion to identify the resource access token.

10. The computer implemented method of claim 9 and further comprising:
    parsing the content portion of the resource access token to identify the first identifier.

11. The computer implemented method of claim 10 and further comprising:
    parsing the parameter portion of the access request to identify the second identifier.

12. The computer implemented method of claim 11 wherein authorizing comprises:
    determining that the access request is an authorized access request based on the comparison result.

* * * * *